Aug. 9, 1927.
H. B. WILLIAMS
1,638,077
VALVE
Filed July 26, 1926
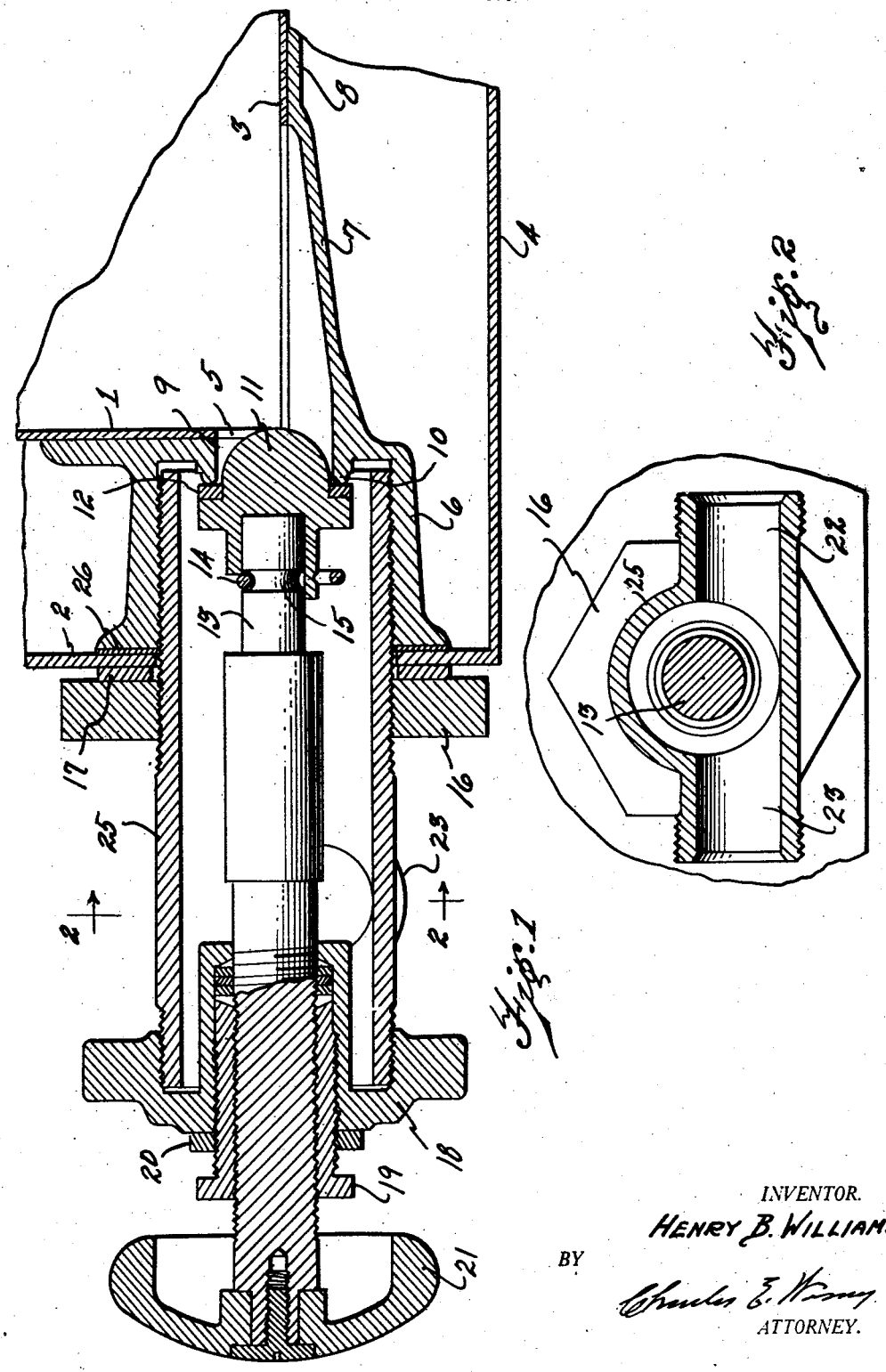
INVENTOR.
HENRY B. WILLIAMS
BY
ATTORNEY.

Patented Aug. 9, 1927.

1,638,077

UNITED STATES PATENT OFFICE.

HENRY B. WILLIAMS, OF DETROIT, MICHIGAN, ASSIGNOR TO JOHN W. LADD CO., OF DETROIT, MICHIGAN, A CORPORATION OF MICHIGAN.

VALVE.

Application filed July 26, 1926. Serial No. 124,843.

This invention relates to valves, more particularly to valves for containers or tanks formed with a double wall such as are used in milk containers in which a cooling or heating fluid is supplied between the outer and inner walls.

An object of the invention is to provide a valve adapted to be applied to such double walled structure and control the outlet of fluid from the inner tank and in which the seat for the valve is provided approximately at the wall of the inner tank.

A further object is to provide a valve construction for a double walled tank in which the valve stem extends in parallelism with the tank bottom and so arranged as to completely drain fluid from the tank and further to provide a valve body of such character of construction that no residue of fluid tends to remain in the body.

Heretofore with valves for this purpose the valve usually has to be placed in the bottom of the tank in order that it will be completely drained and usually the valve body is so arranged that some part of the fluid will remain in the valve body and not naturally drain therefrom. With milk containers it is an essential that the fluid be completely drained from the tank and from the valve and the conduits connected therewith to prevent contamination of a succeeding body of fluid that may be placed in the tank to be discharged through the valve. These objects and the various novel features of the invention are hereinafter more fully described and claimed, and the preferred form of my invention is shown in the accompanying drawings in which—

Fig. 1 is a longitudinal section of my improved valve showing its application to a double walled tank.

Fig. 2 is a section taken on line 2—2 of Fig. 1.

The inner tank is shown at 1 and the outer tank is indicated at 2. The bottom wall of the inner tank is indicated at 3 and of the outer tank at 4. The inner tank 1 has an aperture provided at the bottom which is indicated at 5 which cuts through a part of the vertical wall 1 and a part of the bottom wall 3. Secured between the inner and outer walls of the tank is the hollow casting 6 which may be sweat or otherwise secured to the respective vertical walls 1 and 2 and this casting has an extension 7 fitting about the elongated portion of the aperture in the bottom wall 3 and secured thereto by the flange member 8 that extends about the said bottom aperture. This extension 7 provides a channel for a flow of milk out of the bottom of the inner tank. The hollow cast member 6 is provided with a circular aperture 9 adjacent the inner wall 1 to which the channel of the member 7 leads and this aperture is provided with a seat 10 for the valve 11. The valve is provided with a packing face 12 and is rotatably mounted upon the stem 13, it being secured in place by the usual spring wire indicated at 14 fitting a groove 15 of the stem on one side. This means of connecting a valve with a stem is common and permits the stem to be rotated without rotation of the valve member when in engagement with its seat. The body of the member 6 is internally threaded to receive the threaded body 25 of the valve as indicated in the drawing and threaded onto this body exteriorly of the outer casing 2 is the nut 16 which engages the washer 17 between the member 16 and the wall 2 and a packing 26 is provided between the member 6 and the wall 2 of the tank. The outer end of the body is threaded to receive the bonnet 18 which is provided with a hollow chamber through which the valve stem 13 extends into the chamber. In this chamber is positioned the threaded packing gland 19 which is preferably provided with the usual lock nut 20. On the exterior of the stem is the hand wheel 21 for operation of the valve.

The body 15 of the valve is provided with outlet bosses 22 and 23 on the opposite sides thereof and a single boss may be provided on one side only if so desired. These bosses form outlets for the interior of the body of the valve into which the milk or other fluid flows from the tank 1 and it is to be noted that the lower wall of these outlets 22 and 23 is in practically exact alignment with the inner bottom wall of the body 15. This is provided in order that there may be no obstruction in the path of flow of fluid from the body of the valve to these outlets. To place the outlet bosses at a point above the position described would provide an obstruction to flow of fluid and tend to retain within the body of the valve fluid of a depth equal to the height of the obstruction above the bottom surface of the inner wall.

With this arrangement of a valve the valve member 11 is practically at the discharge orifice of the inner tank and is arranged to permit a complete discharge of fluid from the tank and the arrangement permits the valve to extend outwardly horizontally from the tank rather than from the bottom thereof as has been the practice and therefore more readily accessible to the workmen and the tank can be positioned much closer to the floor than is possible with the valves in the bottom of the tank.

The features of the invention are in the provision of the member 6 providing a chamber which is closed to the space between the two tanks enabling the valve member 11 to be placed adjacent the wall of the inner tank and permitting an easy access to the interior thereof by removal of the bonnet 18 as the removal of the said bonnet carries with it the valve stem and valve and thus provides for free access to the interior of the valve body and permits a ready cleansing of the parts.

The arrangement of the bosses 22 and 23 allows several tanks to be connected in a common line for drawing off from each of the tanks separately or from two or more tanks together. This arrangement saves considerable pipe and fittings.

In the handling and Pasteurization of milk it is important that all of the milk be heated uniformly. Where the valve is placed outside of the outer jacket a portion of the milk is not so treated and is not properly Pasteurized.

Having thus briefly described my invention, what I claim and desire to secure by Letters Patent of the United States is—

1. The combination with an inner and outer tank in spaced relation, the inner tank having an opening extending through the bottom and the side wall at the junction thereof, of a valve member for controlling flow through the said opening consisting of a hollow member in the space between the two walls and having a bottom wall formed with a circular opening and a channel like member formed in continuation thereof and secured about the opening in the bottom wall of the inner member, the said opening in the bottom wall of the hollow member being formed with a valve seat in its outer face, a valve body secured in the said member, a valve stem arranged by rotation to be moved longitudinally of the body, and a valve on the end of the said stem adapted to engage the said seat.

2. The combination with an outer tank and an inner tank, the side and bottom walls thereof being in spaced relation, the inner tank having an opening extending through the bottom and a side wall thereof at their junction, of a hollow member between the said walls and in sealed relation respectively therewith, the said hollow member being open at one end and the bottom wall thereof having an opening formed to provide a valve seat in the interior of the said member, the said hollow member having an extension of channel like form in registration with the opening in the bottom wall of the innner tank and provided with a flange about the said opening in sealed relation with the said bottom wall, a valve member consisting of a tubular body in threaded relation with the said hollow member and sealed to the wall of the outer tank, a valve stem movable longitudinally in the said body, and a valve thereon in rotatable relation with the stem and adapted to be brought to engagement or disengagement with the said seat.

3. The combination with an outer tank and inner tank having side and bottom walls in spaced relation, there being an opening at the junction of the bottom wall and one of the side walls of the inner tank, the opening in the said bottom wall extending to a distance from the junction of the side and bottom walls and being of comparatively narrow form, of a hollow member having a cylindrical threaded interior positioned between the adjacent side walls of the two tanks and in sealed relation therewith, the outer end of the said member being open and the outer tank wall having an opening with which the said opening of the hollow member registers, the inner end of the said hollow member having a small opening arranged to provide valve seat within the interior of the hollow member and registering with the elongated opening of the inner tank, a flange engaging about the opening of the bottom wall, a valve body in threaded relation with the said hollow member and removable through the said outer wall, a packing nut in threaded relation with the said body exteriorly of the wall of the said outer tank, said body being of cylindrical form and having an open outer end, a closure member for the said outer end, a valve stem in threaded relation with the said closure member and by rotation movable longitudinally of the valve body, a valve at the inner end of the stem in rotatable relation therewith adapted to be brought to engagement or disengagement with the seat, the said closure upon removal from the body carrying the said stem and the opening of the body at the closure end being sufficient to permit removal of the valve therewith.

4. The combination with an outer tank and an inner tank, the side and bottom walls of which are in spaced relation, the inner tank having an opening in the bottom and a side wall at the junction thereof, a hollow member having an open outer end and a small opening at the inner end positioned between the said outer and inner walls and enclosing the opening of the inner tank, the said hollow member being flanged and secured in sealed relation with the said walls of the inner and outer tanks, a valve body of tubular form in threaded relation with the hollow member, means for sealing the said body to the wall of the outer tank, a valve member adapted to seat against the opening of the hollow member at a point directly adjacent the inner tank, a stem for operating the valve to open or close the same, and a hollow threaded portion on the said body providing for attachment of a conduit thereto, the lower side of the hollow portion being in the same plane as the lower side of the valve body when the parts are assembled whereby fluid within the valve body will naturally entirely drain therefrom.

5. The combination with an inner and an outer tank in spaced relation, the inner tank having a drainage opening therein, of a valve member for controlling flow through the said drainage opening consisting of a hollow member in the space between the two walls and having a bottom wall adjacent the said drainage opening and provided with an opening through which fluid from the drainage opening may discharge, said body having a flange secured to the wall of the inner tank about the said discharge opening, the opening in the bottom wall of the hollow member being provided with a valve seat, a valve body supported by the hollow member, a valve stem movable longitudinally in the body, and a valve on the said stem adapted to engage the said seat.

In testimony whereof, I sign this specification.

HENRY B. WILLIAMS.